United States Patent [19]

Sachtleben et al.

[11] 4,360,539
[45] Nov. 23, 1982

[54] METHOD FOR INCREASING RESISTANCE TO TREEING IN POLYMERIC INSULATING LAYER

[75] Inventors: Sandra G. Sachtleben, Jefferson; John R. Kirkland, Marshall, both of Tex.

[73] Assignee: Aluminum Company of America, Pittsburgh, Pa.

[21] Appl. No.: 275,070

[22] Filed: Jun. 18, 1981

[51] Int. Cl.³ .................... B05D 7/20; G01B 15/00
[52] U.S. Cl. .................... 427/8; 209/576; 209/578; 209/580; 209/581; 250/362; 250/365; 250/459.1; 427/54.1; 427/117; 427/120; 250/461.1
[58] Field of Search ............ 427/8, 54.1, 117, 120; 209/576, 578, 580, 581; 250/362, 365, 459, 461 R

[56] References Cited

U.S. PATENT DOCUMENTS

| | | | |
|---|---|---|---|
| 3,011,634 | 12/1961 | Hutter et al. | 209/74 |
| 3,305,089 | 2/1967 | Fraenkel | 209/111.5 |
| 4,144,202 | 3/1979 | Ashcraft et al. | 252/63.2 |
| 4,212,756 | 7/1980 | Ashcraft et al. | 252/63.2 |
| 4,263,158 | 4/1981 | Ashcraft et al. | 252/573 |

*Primary Examiner*—James R. Hoffman
*Attorney, Agent, or Firm*—Glenn E. Klepac

[57] ABSTRACT

A method for increasing resistance to treeing in a polymeric layer comprising an insulating layer on a metal conductor. Pellets of an organic polymeric material also containing an organo silane treeing inhibitor are exposed to ultraviolet radiation, and pellets having portions fluorescing above a predetermined threshold level are separated from the remainder. The remaining pellets are blended together and applied to a metal conductor to form a coating on the conductor. In a preferred embodiment, the organic polymeric material is high molecular weight polyethylene, and the ultraviolet radiation has a wavelength of about 3000 to 4000 Å.

10 Claims, 1 Drawing Figure

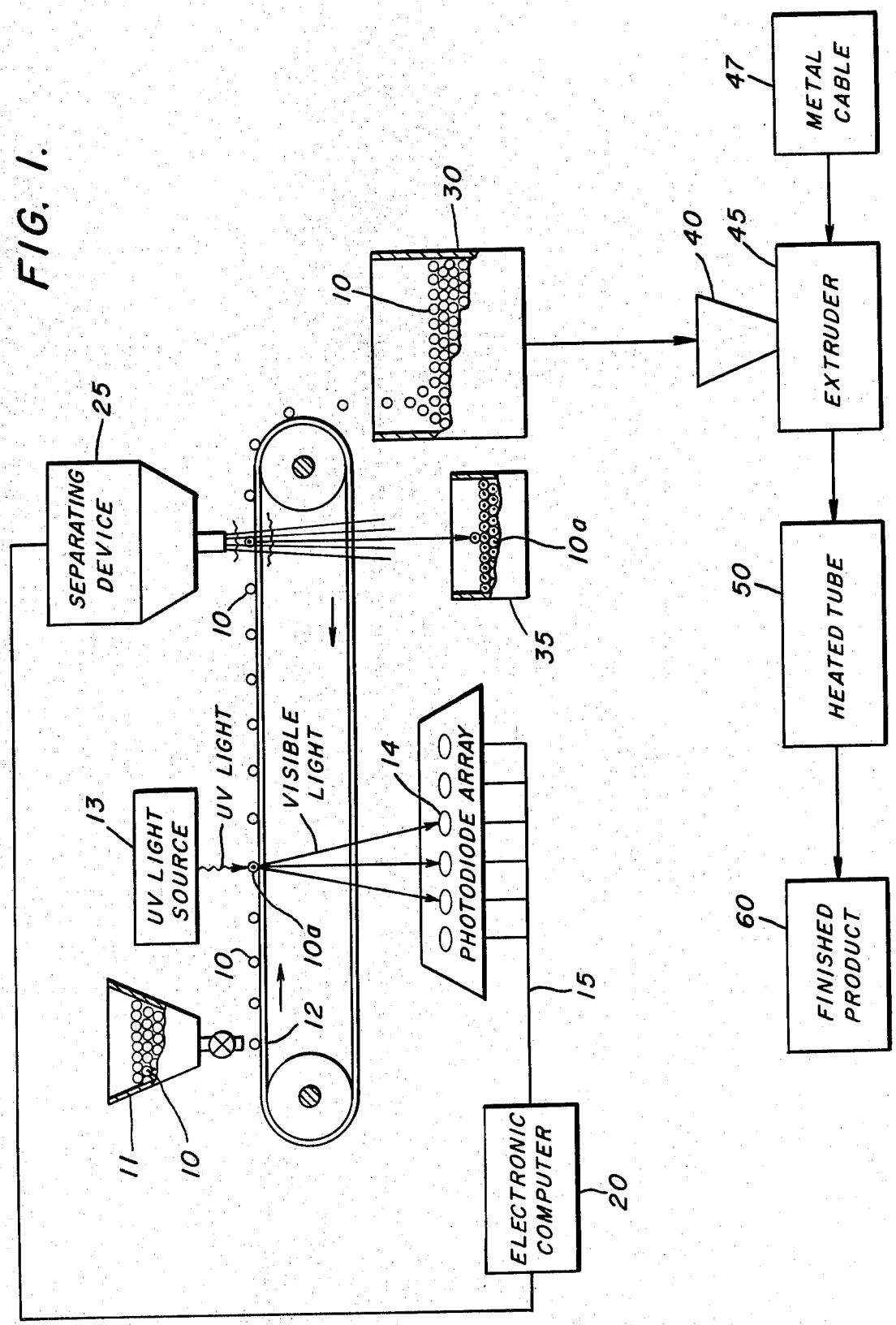

METHOD FOR INCREASING RESISTANCE TO TREEING IN POLYMERIC INSULATING LAYER

BACKGROUND OF THE INVENTION

The present invention relates to a method for improving the quality of dielectric compositions used as insulation for electrical conductor cables. More specifically, the invention relates to a method for improving the resistance to treeing of an insulting layer made from pellets comprising an organic polymeric material and an organo silane treeing inhibitor. The term "treeing" refers to a degradation of electrical insulation caused by exposure to an electric field which results in the formation of microscopic channels or tubes having a tree-like appearance. The term "water treeing" refers to slowly progressing treeing caused by the presence of moisture.

Dielectric compositions having organo silane additives for increasing resistance to treeing are disclosed in U.S. Pat. Nos. 4,144,202 and 4,212,756. To the extent not inconsistent with the present invention, the disclosures of both said patents are incorporated herein by reference.

While the organo silane additives in these patented dielectric compositions are generally successful in slowing or inhibiting growth of trees, the additives themselves are sometimes a source of undesired contamination. It is a principal objective of the present invention to provide a method for increasing resistance to treeing in a polymeric insulating layer on an electrical conductor where the insulating layer is made from a plurality of discrete pellets blended together by fusion at an elevated temperature, and some of the pellets may contain excessive levels of undesired impurities.

It is a related object of the present invention to provide a method of the type described which may be used on a continuous or mass-production scale.

The method of the present invention has the advantage of causing no detectable deterioration in pellets processed and no reduction of quality in an insulating layer made from tested pellets.

Additional objects and advantages of the present invention will become apparent to persons skilled in the art from the following specification and drawing.

SUMMARY OF THE INVENTION

This invention is directed to a method for increasing resistance to treeing in a polymeric insulating layer made from discrete pellets comprising an organic polymer and an organo silane treeing inhibitor. The method is carried out by exposing pellets to ultraviolet radiation; detecting fluorescent light emanating from a pellet containing an undesired impurity; and separating each pellet demonstrating fluorescene above a predetermined threshold level from the remainder of the pellets. A preferred wavelength for the ultraviolet radiation of the invention is about 3000 to 4000 Å, with a 3600 Å source being particularly suitable.

In a preferred embodiment the remaining pellets not demonstrating fluroescence are blended together by fusion at an elevated temperature to form a homogeneous composition. This composition is then applied to a metal conductor over a first semiconducting shield previously applied to the conductor, forming a polymeric insulating layer. In a particularly preferred embodiment, a second or outermost semiconducting shield is applied over the insulating layer.

High molecular weight polyethyelene is a preferred organic polymer.

Other additives which may be included in the pellets processed by the method of the present invention are organic peroxide cross-linking agents and high temperature antioxidants.

BRIEF DESCRIPTION OF THE DRAWING

FIG. 1 is a schematic flow sheet diagram of a preferred method for practicing the present invention.

DETAILED DESCRIPTION OF A PREFERRED EMBODIMENT

The present invention is a method for enhancing the purity of a plurality of small, discrete pellets of polymeric material having the purpose of forming a dielectric layer on metal electrical conductor cable.

Various polyolefin compounds are the most commonly used principal ingredients of these pellets. Preferred polyolefin materials are polyethylene and poly-(ethylene-propylene). Copolymer of ethylene with another unsaturated monomer such as 1-butene or other α-olefins, ethylacrylate, butylacrylate or vinylacetate may also be used. In such copolymers the weight of ethylene is preferably at least 60% of the total weight of ethylene and other unsaturated compounds. In a particularly preferred embodiment, the polymeric material comprises a low-density, high molecular weight polyethylene.

Various additives are included in the pellets to improve their service life. Organo silane compounds are added, usually in an amount of less than 10 parts by weight per 100 parts by weight of the polymer, for improved resistance to water treeing. Various formulations of organo silane additives in polymeric dielectric compositions are set forth in U.S. Pat. Nos. 4,144,202 and 4,212,756, for example, which patents are incorporated herein by reference.

The pellets of the invention may contain other additives in addition to organo silanes. The most commonly used other additives are organic peroxides or similar substances with the ability to effect cross-linking. Examples of some suitable peroxides include dicumyl peroxide, di-t-butyl peroxide and 2,5-dimethyl-2,5-di(t-butylperoxy)-hexyne-3. A preferred peroxide is a mixture of meta and para isomers of $\alpha,\alpha'$-bis(t-butylperoxy) diisopropyl benzene. This mixture is sold commercially by Hercules under the trade name VULCUP. The quantity of peroxide is generally about 0.1 to 5 parts by weight per 100 parts by weight of the polymer.

The polymer may also be provided with an antioxidant, suitably in a quantity of 0.5 to 5 parts by weight per 100 parts by weight of the polymer. One suitable antioxidant is 4,4'-thiobis-(6-t-butyl-o-cresol), which is sold by Monsanto Company under the trade name SANTONOX. Another suitable antioxidant is thioethylene-bis-(3,5-di-t-butyl-4-hydroxy) hydrocinnamate, which is commercially available from Ciba-Geigy under the name IRGANOX 1035.

A dielectric composition comprising a major proportion of ethylene polymer and a minor proportion of an organo silane water-treeing inhibitor is sold commercially by Union Carbide Corporation under the trade designation "TR6202". This composition is sold in the form of small, discrete, cylindrical pellets, each having a weight of about 50 mg. The polymeric material in this composition is a low-density, high molecular weight polyethylene.

Referring now to FIG. 1, the method of the invention is practiced by transferring pellets 10 from a hopper 11 onto a horizontally traveling conveyor belt 12. Soon after leaving the hopper 11, the pellets are exposed to ultraviolet light emanating from a source 13. Portions of the pellets containing localized concentrations of undesired impurities have been found to exhibit fluorescence when exposed to ultraviolet radiation. The source of ultraviolet radiation preferably emits radiation having a wavelength of about 3000 to 4000 Å. A wavelength of 3600 Å is particularly preferred.

Fluorescent light from pellets 10a having impurities is detected or picked up by an array of photodiodes 14 adjacent to the conveyor 12. Electrical signals generated by the photodiodes are conducted by wires 15 to an electronic computer 20. The strength of signals transmitted by the photodiodes 14 to the computer 20 is directly proportional to the level of fluorescence emitted by pellets 10 upon being exposed to ultraviolet radiation. When a pellet 10a includes a portion containing excessive impurities, that pellet 10a demonstrates fluorescence above a predetermined threshold level, and the signal transmitted to the computer 20 exceeds a corresponding limit programmed therein. The computer 20 thereby discriminates between pellets having portions demonstrating fluorescence above a predetermined threshold level and pellets demonstrating either no fluorescence or fluorescence below the threshold level.

The computer 20 includes a time-delay circuit that transmits signals along a line 21 to a separating device 25. The separating device 25 removes contaminated pellets from the remainder of the pellets traveling on the conveyor belt 12. The remaining pellets, having a reduced content of undesired impurities, are deposited into a storage hopper 30 for later use. Contaminated pellets 10a are dumped into a container 35 for disposal or reprocessing.

A suitable form of separating device 25 for removing contaminated pellets 10a in accordance with the present invention is shown and described in U.S. Pat. No. 3,011,634. The separating device shown in this patent includes a nozzle aimed at the trajectory of objects falling from a conveyor belt. Compressed air passing through the nozzle alters the trajectory of selected objects, thereby separating them into different groups. The disclosure of said U.S. Pat. No. 3,011,634 is incorporated herein.

It has been found that when contaminated pellets 10a are removed from a stream of pellets 10 in accordance with the present invention, the remaining or processed pellets 10 have a reduced content of undesired impurities. These remaining pellets are believed to have increased resistance to water treeing compared with similar pellets not processed in accordance with the present invention.

The processed pellets 10 are transferred to a hopper 40 at the entrance of an extruder 45 where they are fused together by heating to form a homogeneous polymeric composition. A metal wire or metal cable 47 or other substrate is moved laterally through the extruder 45. In a preferred embodiment, the metal cable 47 is initially coated with a first semiconducting shield containing carbon black before being presented to the extruder 45. The blended polymeric composition is applied by extrusion adjacent the metal cable 47 to form an insulating layer over the first semiconducting shield. After this step is completed, the coated cable is passed through a heated tube 50. The finished product 60 leaving this tube is a continuous coated cable.

When a cross-linkable polymer is used as the insulating layer, the coated cable is heated in a pressurized environment to increase cross-linking. The tube 50 may then be a steam tube maintained at a pressure of approximately 310 psi.

Optionally and preferably, the polyethylene coated wire 60 is additionally provided with an outermost semiconducting jacket or cover (not shown). Some suitable materials for this outer jacket are thermoplastic polyethylene, deformation-resistant thermoplastic polyethylene and ethylene-propylene rubbers containing carbon black.

The foregoing description of our invention has been made with reference to a single preferred embodiment thereof. Numerous changes and modifications can be made therein without departing from the spirit and scope of the following claims.

What is claimed is:

1. A method for enhancing the purity of a plurality of discrete pellets comprising an organic polymeric material and an organo silane treeing inhibitor, said method comprising the steps of
   (a) exposing at least one of said pellets to ultraviolet radiation, thereby to cause fluorescence in a portion of an exposed pellet comprising an undesired impurity;
   (b) detecting fluorescent light from a pellet containing an undesired impurity; and
   (c) separating from the remainder of the pellets a pellet including a portion demonstrating fluorescence, thereby to increase resistance to treeing in a polymeric insulating layer manufactured from said remainder of the pellets.

2. The method of claim 1 further comprising the steps of
   (d) fusing together said remainder of the pellets to form an organic polymeric composition; and
   (e) applying said organic polymeric composition adjacent a metal conductor, thereby to form a coating adjacent said conductor.

3. The method of claim 1 further comprising the step of
   (f) discriminating between a pellet including a portion demonstrating fluorescence above a predetermined threshold level and a pellet demonstrating either no fluorescence or fluorescence below a predetermined threshold level.

4. The method of claim 1 wherein the wavelength of said ultraviolet radiation is about 3000 to 4000 Å.

5. The method of claim 4 wherein the wavelength of said ultraviolet radiation is about 3600 Å.

6. The method of claim 1 wherein said organic polymeric material comprises an ethylene polymer.

7. The method of claim 6 wherein said pellet further comprises a high temperature antioxidant for the ethylene polymer.

8. The method of claim 6 wherein said pellet further comprises an organic peroxide cross-linking agent.

9. The method of claim 6 wherein said organic polymeric material is a polyolefin selected from the group consisting of polyethylene, poly(ethylene-propylene) and copolymers of ethylene and 1-butene.

10. The method of claim 1 further comprising the step of
   (d) fusing together said remainder of the pellets to form an organic polymeric composition.

* * * * *